US008427803B2

(12) United States Patent
Liberto et al.

(10) Patent No.: US 8,427,803 B2

(45) **Date of Patent: *Apr. 23, 2013**

(54) CURRENT TRANSFORMER WITH INTEGRATED ACTUATOR

(75) Inventors: Sandro Liberto, Rohr (CH); Hans Weichert, Granichen (CH); Beat Villiger, Reinach (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/762,894

(22) Filed: Apr. 19, 2010

(65) Prior Publication Data

US 2010/0332046 A1 Dec. 30, 2010

Related U.S. Application Data

(60) Provisional application No. 61/176,677, filed on May 8, 2009.

(30) Foreign Application Priority Data

Mar. 26, 2010 (EP) .................................... 10158680

(51) Int. Cl.
*H02H 3/08* (2006.01)

(52) U.S. Cl.
USPC .......................... 361/93.1; 361/93.6; 361/102

(58) Field of Classification Search ........................ None
See application file for complete search history.

(56) References Cited

U.S. PATENT DOCUMENTS

| | | | | |
|---|---|---|---|---|
| 3,566,320 | A | | 2/1971 | Bakes |
| 3,688,227 | A | | 8/1972 | Hong |
| 3,760,309 | A | | 9/1973 | McIntosh et al. |
| 3,932,791 | A | * | 1/1976 | Oswald ......................... 361/100 |
| 5,532,895 | A | * | 7/1996 | Chiu ............................... 361/35 |

(Continued)

FOREIGN PATENT DOCUMENTS

| | | | |
|---|---|---|---|
| DE | 19721591 | A1 | 5/1999 |
| EP | 0626713 | A1 | 11/1994 |
| EP | 1551039 | A2 | 7/2005 |
| WO | 0150569 | A2 | 7/2001 |

OTHER PUBLICATIONS

ABB: "Emax Low Voltage Air Circuit-breakers. Technical Catalogue". Dec. 2008, pp. 1-278, XP002596845. http://www05.abb.com/global/scot/scot209.nsf/veritydisplay/3188b874c09378c2c12575a100532717/$File/1SDC200006D0206.pdf. Last accessed on Aug. 17, 2010, 16 pages.

European Search Report for EP Application No. 10158680.8-2214, dated Aug. 31, 2010, 11 pages.

(Continued)

*Primary Examiner* — Jared Fureman
*Assistant Examiner* — Terrence Willoughby
(74) *Attorney, Agent, or Firm* — William R. Walbrun; Turocy & Watson, LLP; John M. Miller

(57) ABSTRACT

A system comprising a magnetic actuator, a current transformer and operational electronics in a dual-coil circuit breaker. The system includes an inline implementation of the primary and secondary coils to maintain a narrow width suitable for retrofitting in currently designed industrial rack mounted enclosures. The system further comprises network connectivity allowing interrogation of the components for operational data associated with the component.

20 Claims, 11 Drawing Sheets

U.S. PATENT DOCUMENTS

| | | | |
|---|---|---|---|
| 5,726,846 | A | 3/1998 | Houbre |
| 6,414,575 | B1 | 7/2002 | Swift |
| 6,445,268 | B1 * | 9/2002 | Daum ........................... 335/172 |
| 6,560,084 | B1 | 5/2003 | Bilac et al. |
| 7,012,800 | B2 | 3/2006 | Busch et al. |
| 2004/0145846 | A1 | 7/2004 | Fasano et al. |

OTHER PUBLICATIONS

Office Action dated Oct. 5, 2012 for U.S. Appl. No. 13/177,946, 25 pages.

* cited by examiner

CURRENT TRANSFORMER WITH INTEGRATED ACTUATOR

CROSS-REFERENCE TO RELATED APPLICATIONS

This application claims priority from European Application No. 10158680.8, filed on Mar. 26, 2010, and U.S. Application No. 61/176,677, filed on May 8, 2009. The entireties of each of the foregoing applications are incorporated herein by reference.

BACKGROUND

Typical current motor protection circuit breakers, for rated currents up to approximately one hundred amps, are designed with bimetal strips/heaters for thermal protection and magnetic plungers for short circuit protection. The operation of these devices produces a significant amount of power loss in the form of heat. The trend of government regulation and public opinion is towards a reduction in power consumption of all electrical devices, creating market pressure for more efficient electrical device designs. Further, reduced operating expenses are available to encourage the use of the design in new applications and to offset the cost of retrofitting existing applications with a more efficient circuit breaker.

Another shortcoming in the design of this class of existing circuit breakers is the lack of integrated electronics for measuring circuit breaker conditions and the ability to communicate this data to a control system or network. Greater efficiency of operation and preventative maintenance opportunities are lost because the first sign of a problem with the circuit breaker is after circuit breaker failure. The consumer trend towards sophisticated control systems and control system network communications is creating additional market pressure to provide the ability to integrate this level of electrical device into the communication network of an existing control system.

Further, market interest in this class of circuit breaker with regard to the design's operational characteristics, such as speed of contact opening, prevention from reclosing and prevention from welding are required but a smaller form factor is desired to reduce manufacturing cost by allowing the circuit breaker to fit into existing smaller case designs and increase the applicability of the device by opening new areas of application. Accordingly, market pressure due to the unfulfilled need for a more power efficient circuit breaker, meeting expected government and industry standards, containing self-powered electronics for data collection and communication, but fitting in a smaller and possibly previously existing form factor has driven circuit breaker development in a direction previously thought unobtainable.

SUMMARY

The following presents a simplified summary in order to provide a basic understanding of some aspects of the disclosed innovation. This summary is not an extensive overview, and it is not intended to identify key or critical elements or to delineate the scope of the invention. Its sole purpose is to present some concepts in a simplified form as a prelude to the more detailed description presented later.

The present innovation blends the desirable characteristics of the existing class of circuit breakers with the aspects required by the pressure from a new market direction to create a new class of circuit breaker. The new class of circuit breaker provides protection previously believed obtainable only in a large inefficient design in a reduced form factor fitting today's requirements and existing enclosures. Reduction in size is accomplished by an inline dual coil design targeted at reducing the width of the required enclosure unlike existing designs using concentric dual coil implementations.

The heart of the design uses a dual coil winding system of separate but inline coils to reduce the physical dimensions of the circuit breaker enclosure. The inline design allows the coil windings of the plunger system to act as the primary coil of a current transformer providing power for the embedded electronics. The multiple turns of the primary coil winding provide for higher line outputs for powering the embedded data collection and communication electronics. Additionally, the primary coil serves to measure the primary current, acting as a data source for communication to the integrated electronics for communication to the communicatively connected network and control system. Further, an integrated magnetic actuator is included to provide fast contact opening when an overload is detected. The integrated magnetic actuator further serves to prevent the problems of reclosing and welding, typical of other circuit breaker designs of this physical size for this current load, when an overload is serviced.

According to an aspect of the invention, a system for a circuit breaker comprises: a primary coil component for providing current based overload protection; a magnetic actuator component for disconnecting circuit breaker contacts; a secondary coil component for providing voltage based overload protection; and a control system interface component for communicating operational data. According to another aspect of the invention, a system for a circuit breaker comprises: means for providing current-based overload protection; means for disconnecting the circuit breaker contacts; means for providing voltage-based overload protection; and means for communicating operational data.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
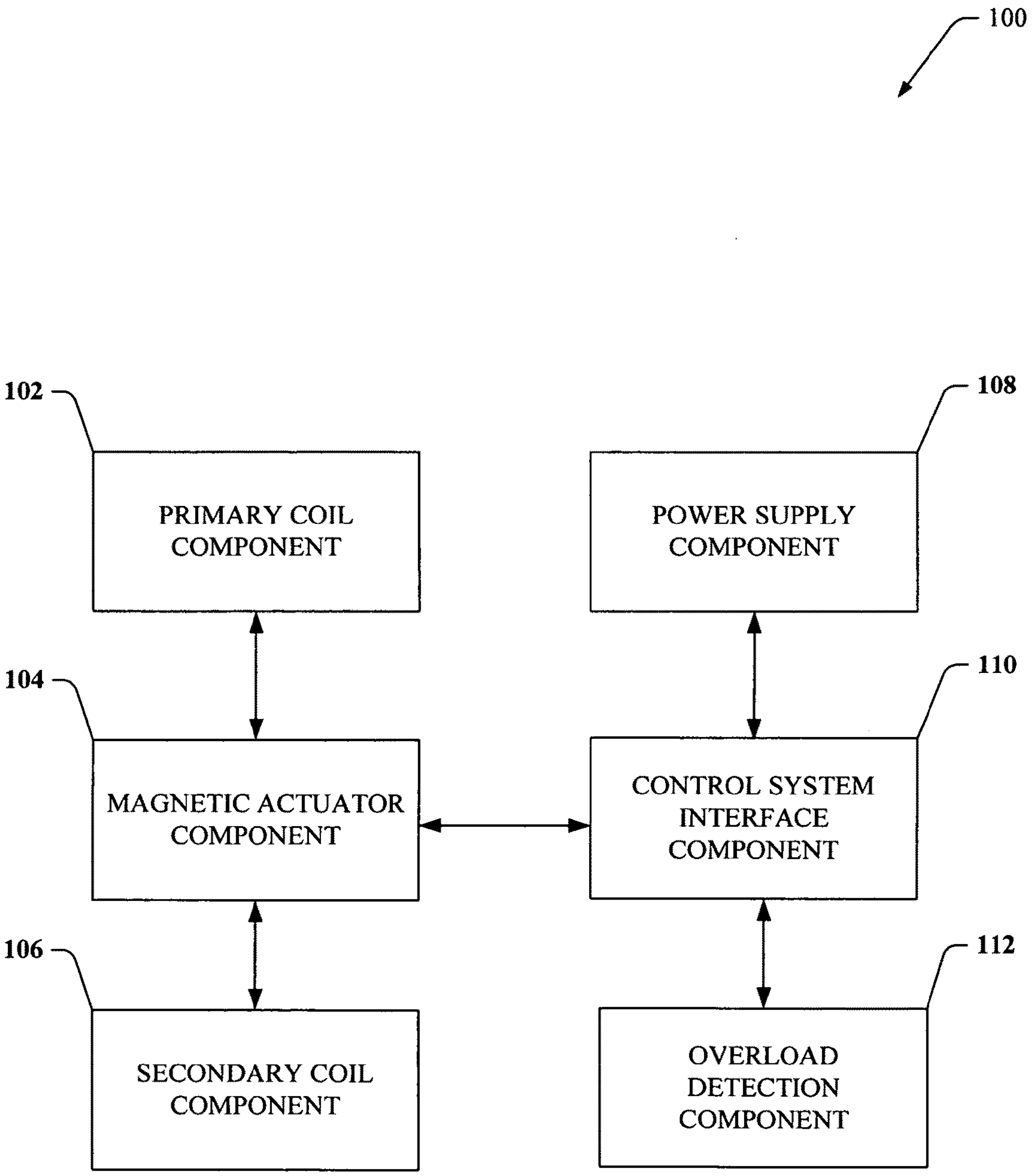
FIG. 1 depicts a block diagram of a current transformer with integrated magnetic actuator and embedded electronics for measurement and communications.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer, an industrial controller, a relay, a sensor and/or a variable frequency drive. By way of illustration, both an application running on a server and the server can be a component. One or more components can reside within a process and/or thread of execution, and a component can be localized on one computer and/or distributed between two or more computers.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a variable frequency drive and controller, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a block diagram 100 of a current transformer with integrated magnetic actuator and embedded electronics for measurement and communications including a primary coil component 102, a magnetic actuator component 104, a secondary coil component 106, a power supply component 108, a control system interface component 110 and an overload detection component 112.

The primary coil component 102 is the current coil and provides sufficient windings to provide power for the control system interface component 110 and to act as the measurement device for the primary current. The primary coil component 102 wraps a plunger component and is implemented separately from the secondary coil component 106 but in-line with the coil component 106 to reduce enclosure size requirements.

The magnetic actuator component 104 simultaneously provides an instantaneous trip and an induced delay trip capability. The magnetic actuator component 104 is not susceptible to the inefficient power based heat generation problems of bimetal thermal overload detectors and is immediately ready for reset after tripping. The magnetic actuator component 104 implements integrated mechanical movement of the plunger and the armature based on magnetic field strength driven by current load of the primary coil component 102 to break the contacts in an overload condition. As one non-limiting example, the magnetic actuator component 104 is designed as a spring loaded plunger acting as the armature of the primary coil component 102.

The secondary coil component 106 provides the voltage coil for allowing a remote or "panic" shutdown. As previously described, the implementation of the design is separate coils oriented inline to allow the use of a smaller form factor enclosure. As an example of the differences in the subject innovative design and a typical existing design, a typical existing design would include concentric dual coils. The physical geometry of requiring a secondary coil to wrap around the outer diameter of the primary coil would prohibit the desired reduction in size of the enclosure because of the width requirements of the concentric coils.

The power supply component 108 provides power for the integrated measurement and communication aspects of the control system interface component 110. The power supply component 108 derives its source from the windings of the primary coil component 102 and is designed to match the power supply requirements of the control system interface component 110.

The control system interface component 110 provides the electronics allowing the measurement of circuit breaker related data and the communication of the circuit breaker related data to other devices communicatively connected to the control system interface component 110. The control system interface component 110 collects data such as current flow of the primary coil, voltage of the secondary coil, temperature of the enclosure and its components and tripping events associated with overload conditions or remote shutdown. The control system interface 110 communicates the collected information to any devices communicatively connected to the control system interface component 110.

The overload measurement component 112 provides for detecting a current overload in the primary coil based on the increasing magnetic field strength surrounding the magnetic actuator component 104 and the voltage overload in the secondary coil based on a remote shutdown supply voltage. The mechanisms of overload measurement component 112 provide for instantaneous shutdown in short circuit conditions but also allow delayed shutdown for overload conditions not involving a short circuit. In another aspect, the described shutdown mechanisms accomplish this task without the inefficient generation of heat typical with the bimetal design of overload protection.

Figure 2:
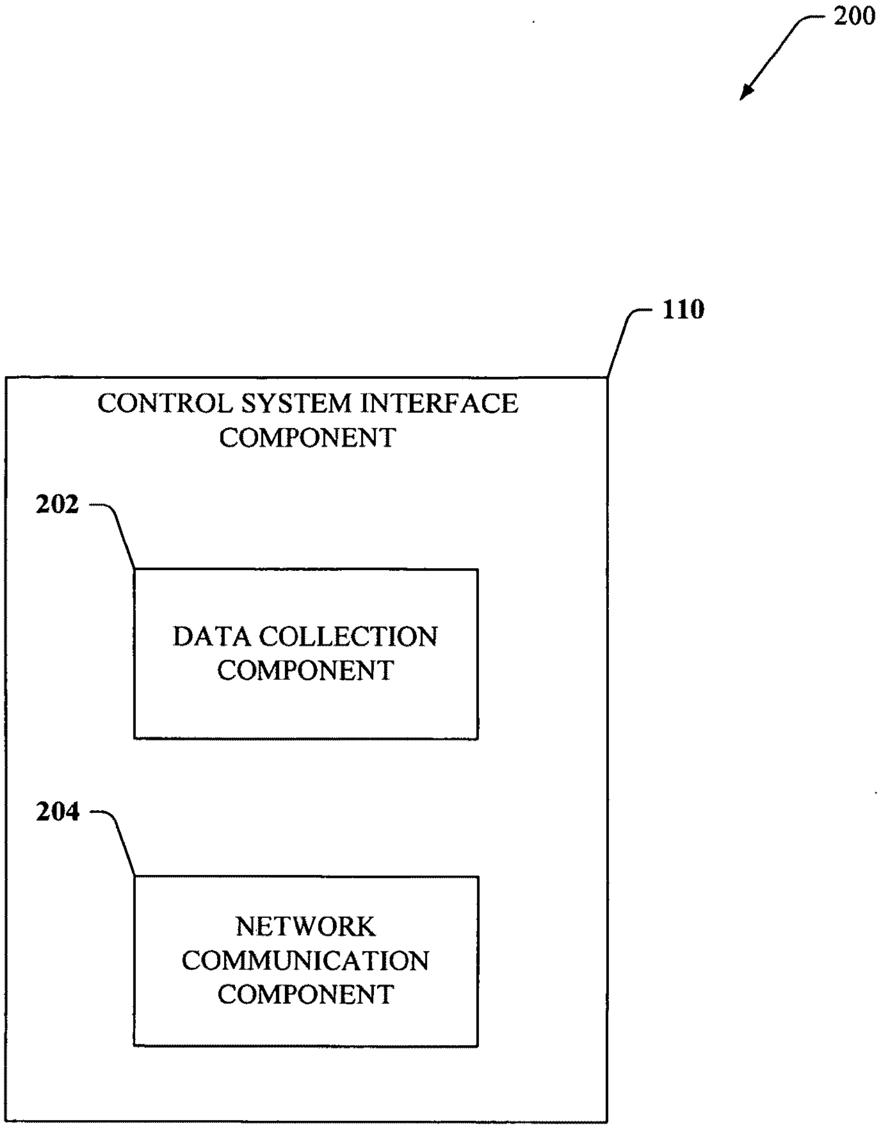
FIG. 2 depicts a block diagram of the control system interface component of a current transformer with integrated magnetic actuator and embedded electronics for measurement and communications including a data collection component and a network communication component.
Figure 3A:
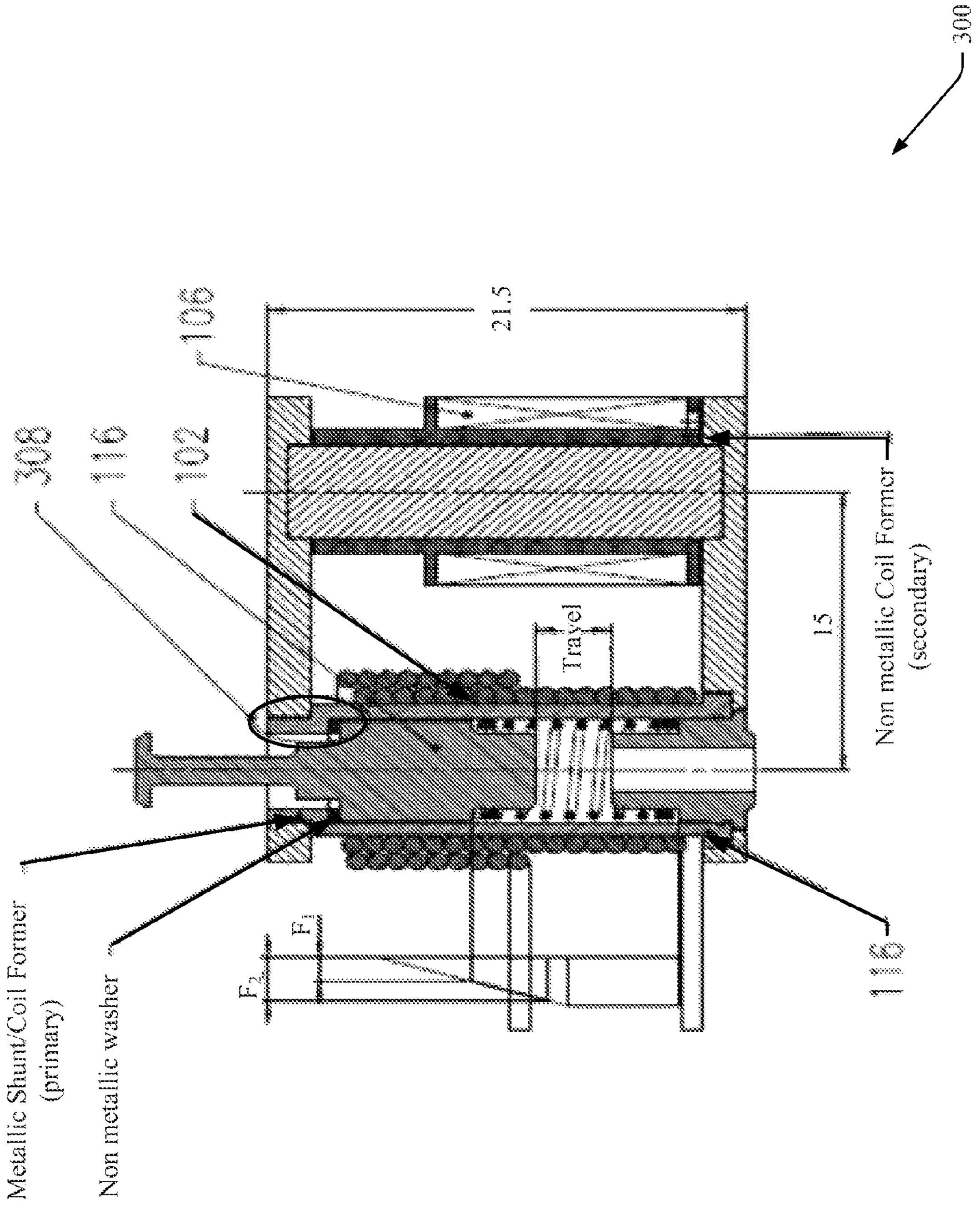
FIGS. 3A-F depict the inline dual coil winding of a current transformer with integrated magnetic actuator and embedded electronics for measurement and communications.
Figure 3B:
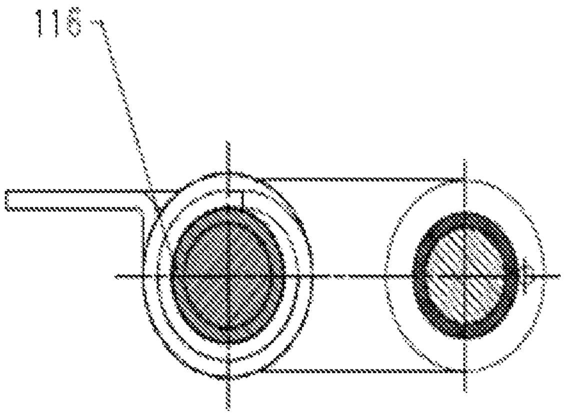
Figure 3C:
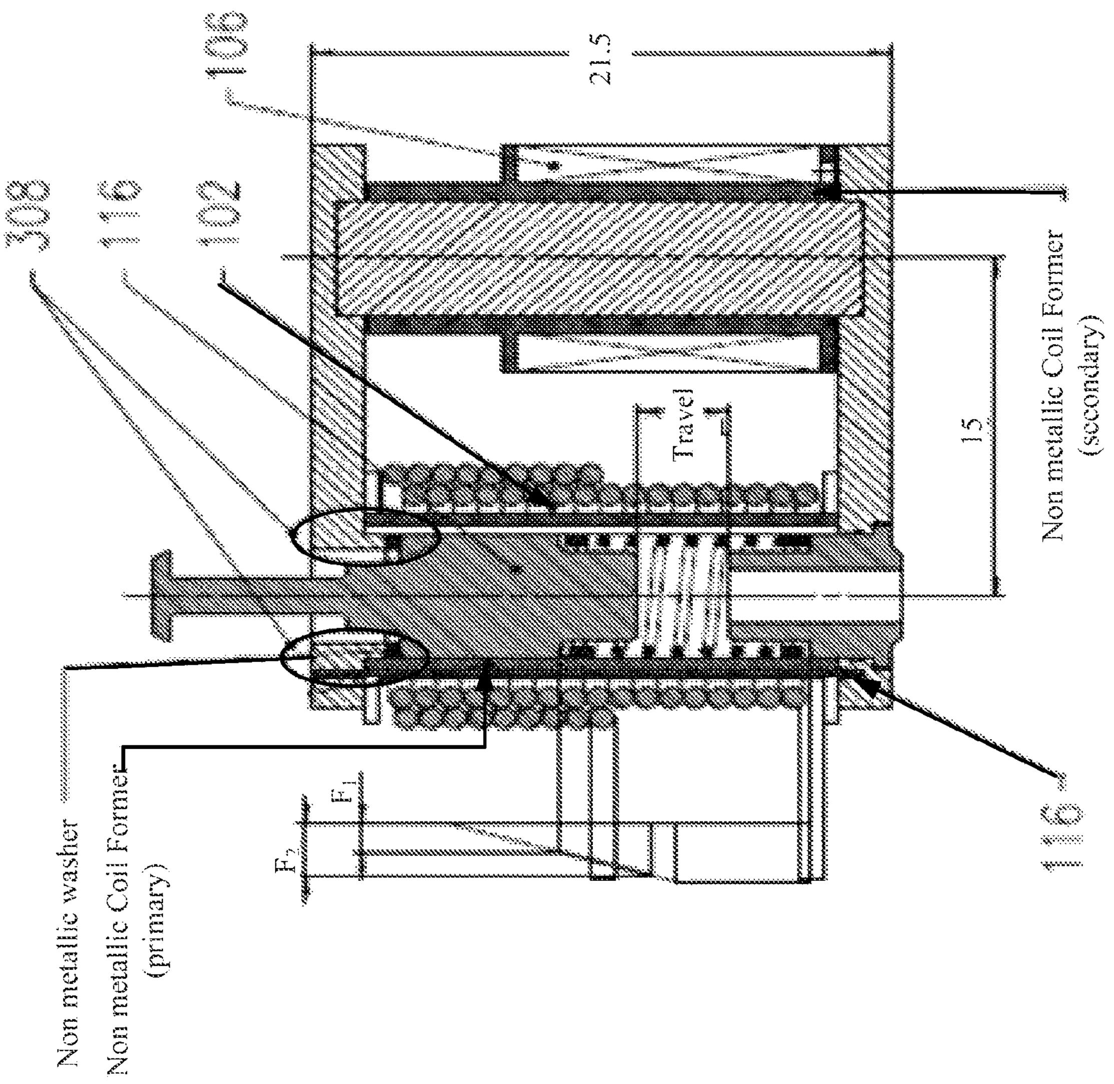
Figure 3D:
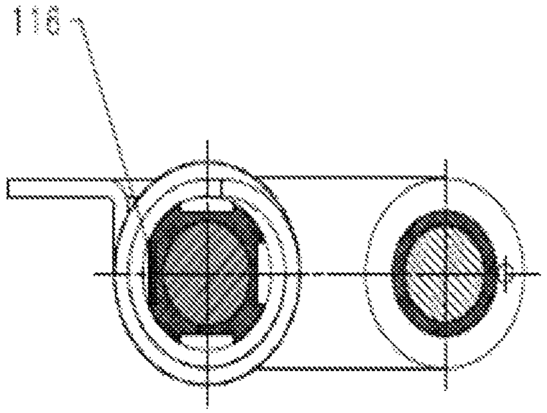
Figure 3E:
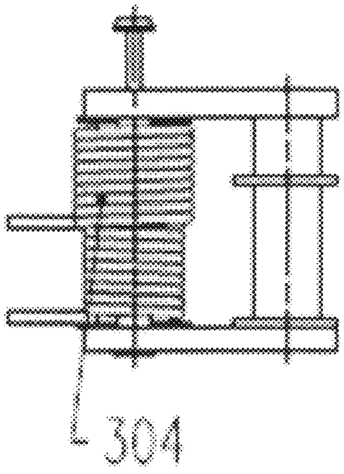
Figure 3F:
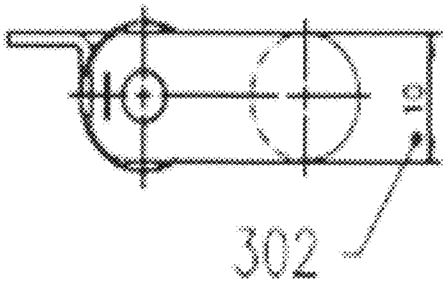

Referring again to the drawings, FIG. 2 depicts in 200 the control system interface component 110 including the data collection component 202 and the network communication component 204. The data collection component 202 provides measurement electronics suitable to measure the current of the primary coil component 102, the voltage of the secondary coil component 106, the voltage of the power supply component 108, the temperature of the enclosure components and the load exerted on the plunger deflection spring. The data measurements available to the data collection component 202 are provided to the network communication component for transmission to other devices communicatively connected to the control system interface component 110. The data can be analyzed and for further analysis.

The network communication component 204 provides the ability to communicate to other devices on a network. For example, an industrial controller can interrogate the network communication component 204 over a control network and request the current values of any data measurable by the data collection component 202. Further, an industrial controller can request the value of the current measurement for the primary coil and the temperature of the enclosure. The network communication component 204 will package the requested data in a format suitable for the connected network and transmit the data to the requesting device.

In another aspect, the network communication component 204 can receive a communication containing a command to perform an action such as opening the contacts. Upon receiving such a command, the network communication component 204 directs an overload voltage to the secondary coil and performs a remote shutdown. In another aspect, the network communication component 204 can communicate the occurrence of a shutdown, for any reason and by either coil to a device communicatively connected to the network communication component 204 without a prior request from the device for the data.

Referring now to FIGS. 3A-F, the inline design of the dual coil system is illustrated, including the plunger type magnetic actuator component 104, the current measuring primary coil 102 and the voltage measuring secondary coil 106. The inline dimensional drawing 302 (in FIG. 3F) depicts the space savings of a dual coil system of a non-concentric type allowing for the placement of the system 100 in existing enclosure designs. In another aspect, primary coil 304 (in FIG. 3E) depicts sufficient windings to provide enough power to support the data collection component 202 and the network communication component 204 of the control system interface component 110.

Figure 4:
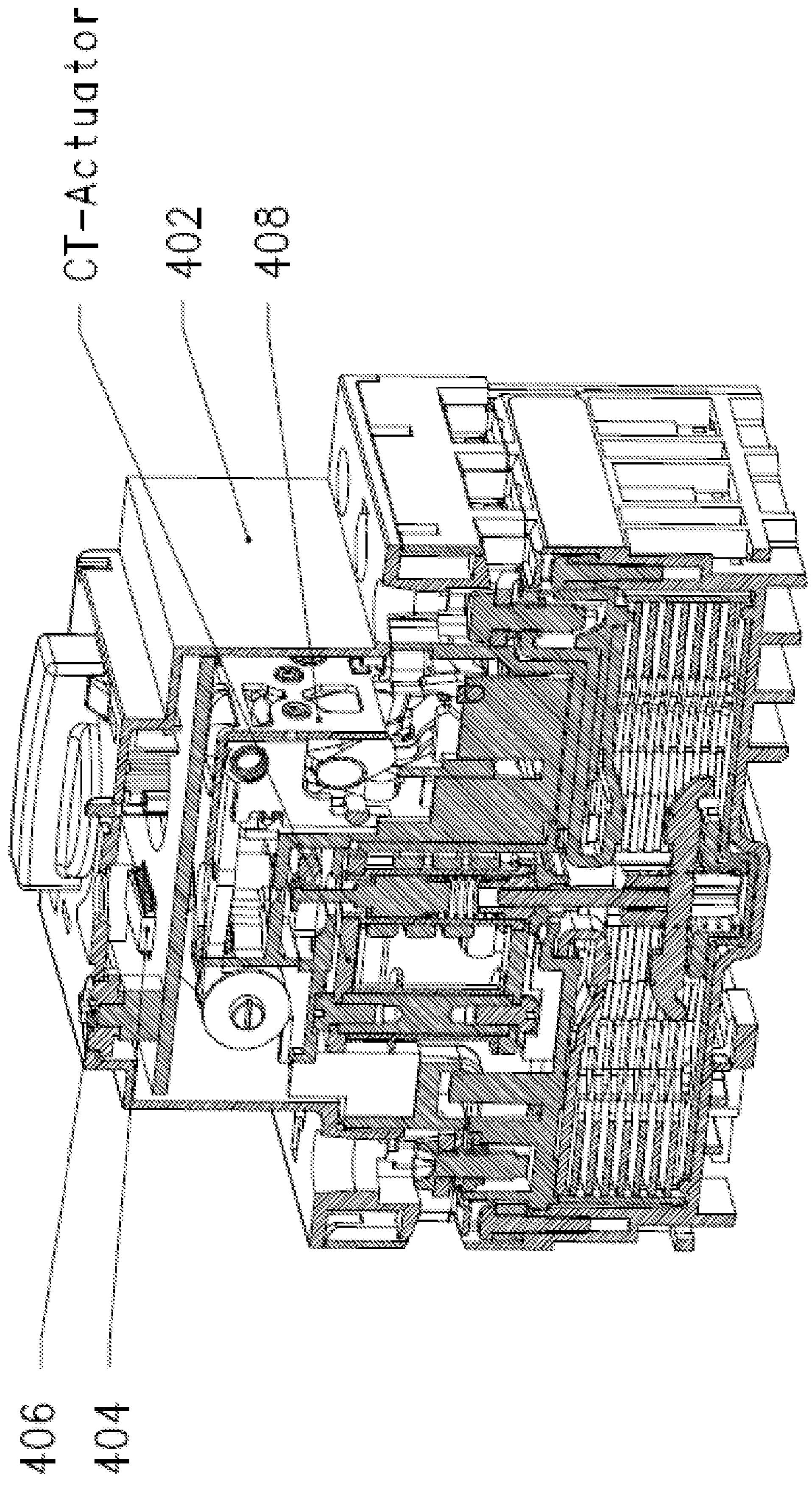
FIG. 4 depicts a three-dimensional representation of a reduced size enclosure containing a current transformer with integrated magnetic actuator and embedded electronics for measurement and communications and an inline dual coil winding.

Referring to FIG. 4, a three-dimensional depiction of the inline dual coil system is illustrated, including the preexisting enclosure 402, the primary coil 102, the secondary coil 106, the plunger 408, a magnetic shunt 410, the control system interface component 110 electronics 404 and the control system interface component 110 network connection 406. The width of the preexisting enclosure 402 requires a narrow coil design and would not work if the coils were implemented in a concentric fashion. The control system interface component 110 electronics 404 are powered from the additional windings of the primary coil and provide for data collection and networked based bidirectional communication to other devices on the communicatively connected network. The network connection 406 port provides the point of attachment for the network cable suitable to position the enclosure in existing control component mounting racks.

Figure 5:
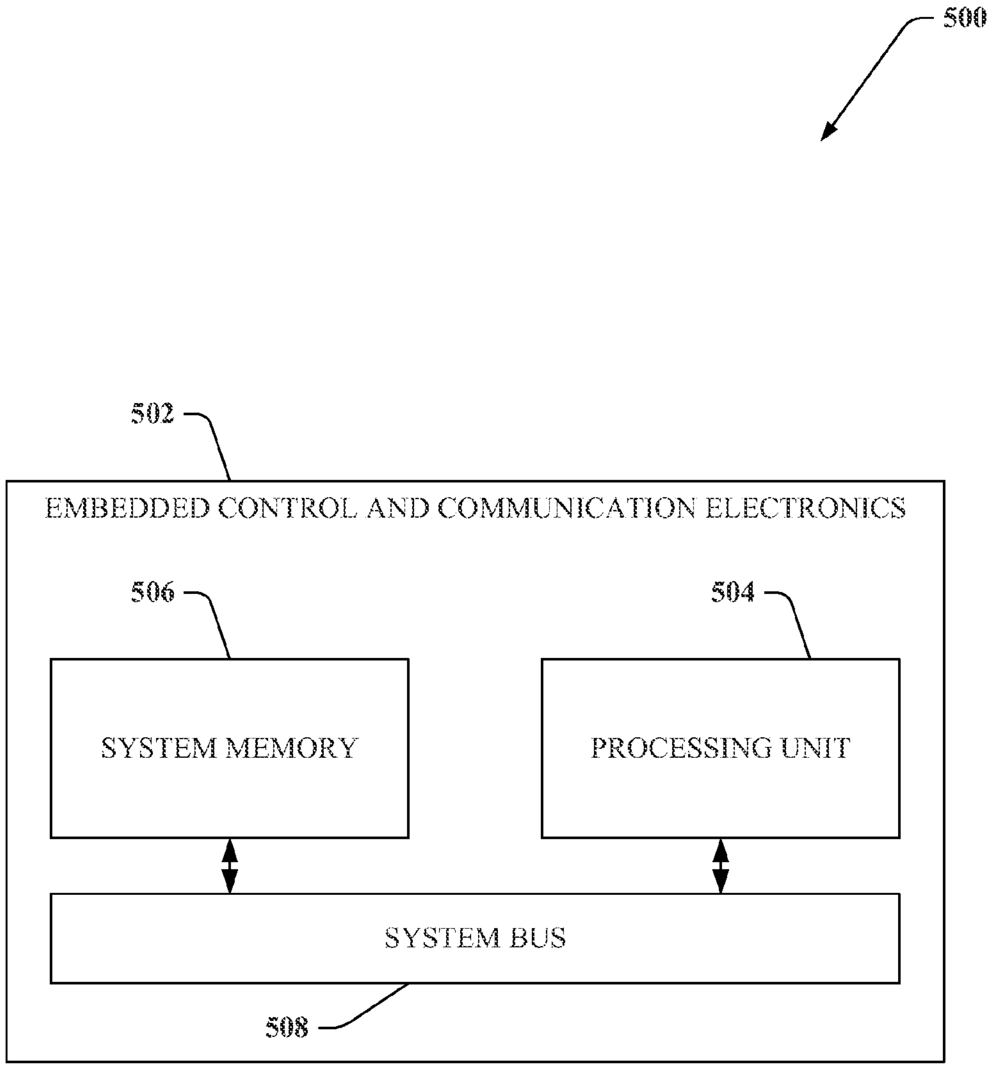
FIG. 5 depicts a schematic block diagram illustrating a suitable operating environment for the embedded control and communication electronics.

With reference to FIG. 5, the exemplary computing environment 500 for implementing various aspects includes embedded control and communication electronics 502, including a processing unit 504, a system memory 506 and a system bus 508. The system bus 508 couples system components including, but not limited to, the system memory 506 to the processing unit 504. The processing unit 504 can be any of various commercially available processors, such a single core processor, a multi-core processor, or any other suitable arrangement of processors. The system bus 508 can be any of several types of bus structure that can further interconnect to a memory bus (with or without a memory controller), a peripheral bus, and a local bus using any of a variety of commercially available bus architectures. The system memory 506 can include read-only memory (ROM), random access memory (RAM), high-speed RAM (such as static RAM), EPROM, EEPROM, and/or the like. Additionally or alternatively, the computer 502 can include a hard disk drive, upon which program instructions, data, and the like can be retained. Moreover, removable data storage can be associated with the embedded control and communication electronics 502. Hard disk drives, removable media, etc. can be communicatively coupled to the processing unit 504 by way of the system bus 508.

The system memory 506 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the embedded control and communication electronics 502 through one or more wired/wireless input devices, such as a keyboard, pointing and clicking mechanism, pressure sensitive screen, microphone, joystick, stylus pen, etc. A monitor or other type of interface can also be connected to the system bus 508.

The embedded control and communication electronics 502 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The embedded control and communication electronics 502 can connect to other devices/networks by way of antenna, port, network interface adaptor, wireless access point, modem, and/or the like.

The embedded control and communication electronics 502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

Figure 6:
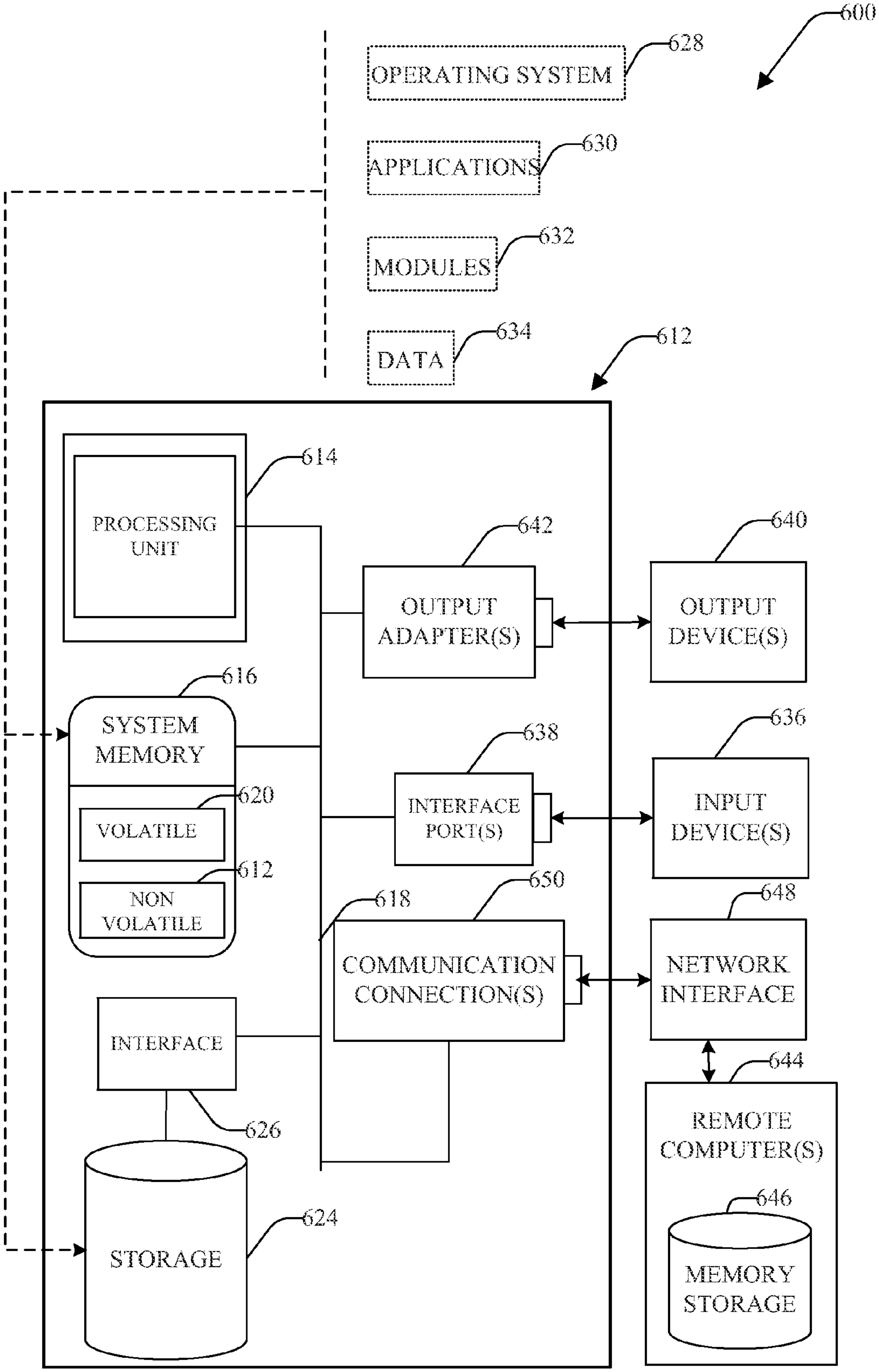
FIG. 6 depicts a schematic block diagram of a sample-computing environment.

In order to provide a context for the various aspects of the disclosed subject matter, FIG. 6 as well as the following discussion is intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary environment 600 for implementing various aspects disclosed herein includes a computer 612 (e.g., desktop, laptop, server, hand held, programmable consumer or industrial electronics . . . ). Additionally, computer 612 can comprise an actual target hardware system, and can comprise an embedded computer that has all the characteristics of environment 600. The computer 612 includes a processing unit 614, a system memory 616, and a system bus 618. The system bus 618 couples system components including, but not limited to, the system memory 616 to the processing unit 614. The processing unit 614 can be any of various available microprocessors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/non-removable, volatile/non-volatile computer storage media. FIG. 6 illustrates, for example, disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 600. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the present invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612 and to output information from computer 612 to an output device 640. Output adapter 642 is provided to illustrate that there are some output devices 640 like displays (e.g., flat panel and CRT), speakers, and printers, among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems, power modems and DSL modems, ISDN adapters, and Ethernet cards or components.

Figure 7:
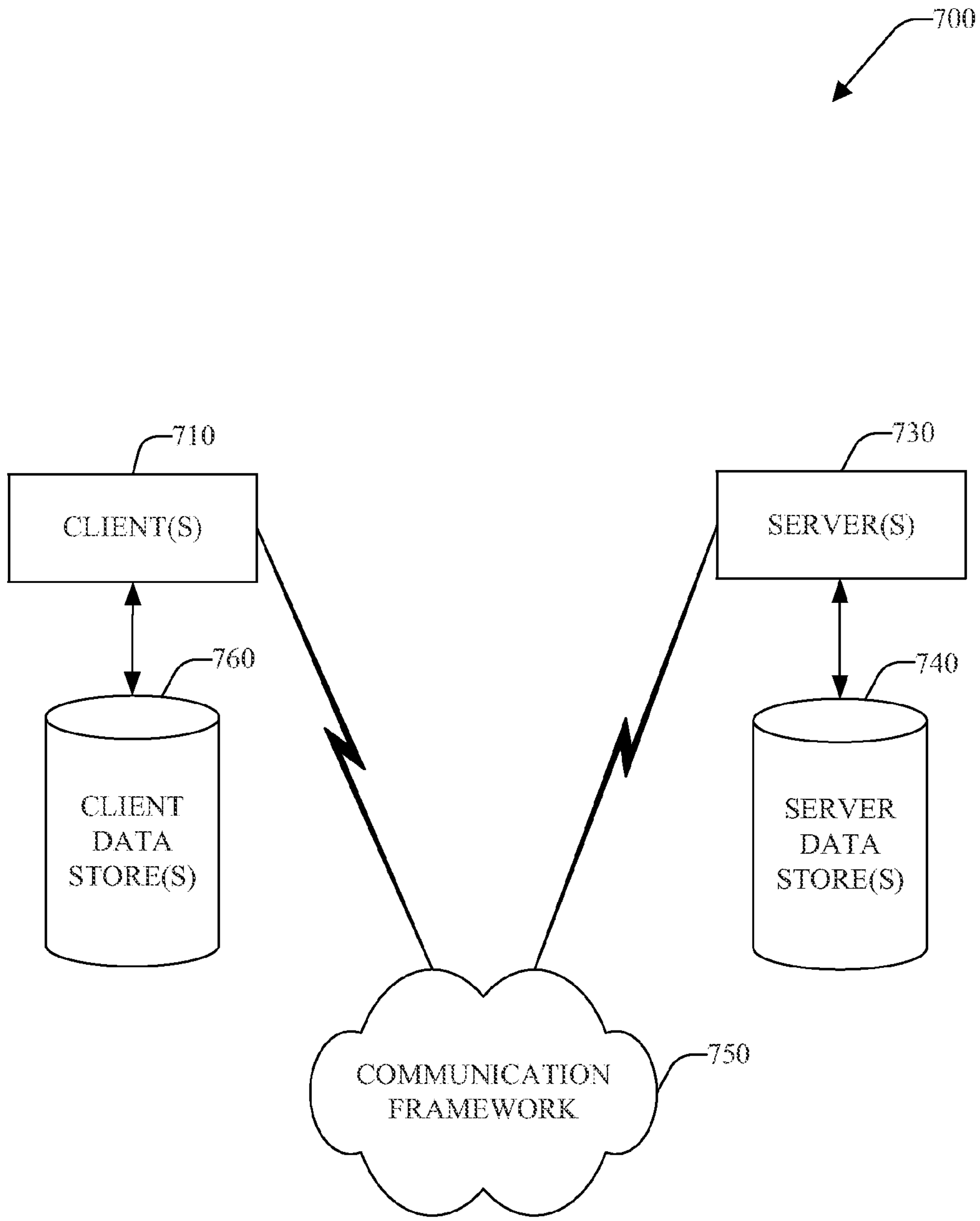
FIG. 7 depicts a schematic block diagram of a sample-computing network environment.

FIG. 7 is a schematic block diagram of a sample-computing environment 700 with which the present invention can interact. The system 700 includes one or more client(s) 710. The client(s) 710 can be hardware and/or software (e.g., threads, processes, computing devices). The system 700 also includes one or more server(s) 730. Thus, system 700 can correspond to a two-tier client server model or a multi-tier model (e.g., client, middle tier server, data server), amongst other models. The server(s) 730 can also be hardware and/or software (e.g., threads, processes, computing devices). The servers 730 can house threads to perform transformations by employing the present invention, for example. One possible communication between a client 710 and a server 730 may be in the form of a data packet adapted to be transmitted between two or more computer processes.

The system 700 includes a communication framework 750 that can be employed to facilitate communications between the client(s) 710 and the server(s) 730. The client(s) 710 are operatively connected to one or more client data store(s) 760 that can be employed to store information local to the client(s) 710. Similarly, the server(s) 730 are operatively connected to one or more server data store(s) 740 that can be employed to store information local to the servers 730.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or similar result. Moreover, not all illustrated blocks are required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

It is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI) that communicate via the network which includes control, automation, and/or public networks. The industrial controller can also communicate to and control various other devices such as Input/Output modules including Analog, Digital, Programmed/Intelligent I/O modules, other industrial controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

What is claimed is:

1. A circuit breaker system, the system comprising:

a primary coil adapted to provide current based overload protection;

a secondary coil adapted to provide voltage based overload protection, wherein the secondary coil is positioned inline with the primary coil; and a processor, communicatively coupled to a memory, configured to execute or facilitate execution of computer-executable components stored on the memory, the computer-executable components comprising:

a control system interface component adapted to communicate operational data with an industrial automation device, wherein the operational data includes data indicative of a load exerted on a plunger deflector spring.

2. The circuit breaker system of claim 1, wherein the primary coil is a current coil and is implemented separately from the secondary coil, the primary coil being adapted to provide power for the control system interface component.

3. The circuit breaker system of claim 1, further comprising:

a magnetic actuator component that disconnects a circuit breaker contact of the circuit breaker system.

4. The circuit breaker system of claim 3, further comprising:

a plunger component that employs a magnetic plunger for short circuit protection, wherein the primary coil is wrapped around the magnetic plunger.

5. The circuit breaker system of claim 4, wherein the magnetic actuator component is further configured to implementan integrated mechanical movement of the plunger component and an armature based on a magnetic field strength driven by a current load of the primary coil to break the circuit breaker contact, in response to a determination that an overload criterion is satisfied.

6. The circuit breaker system of claim 4, wherein the magnetic actuator component is designed as a spring loaded plunger which acts as an armature of the primary coil.

7. The circuit breaker system of claim 3, further comprising an overload measurement component adapted to detect a current overload in the primary coil based on an increasing magnetic field strength surrounding the magnetic actuator component.

8. The circuit breaker system of claim 7, wherein the overload measurement component being further adapted to detect a voltage overload in the secondary coil based on a remote shutdown supply voltage.

9. The circuit breaker system of claim 1, wherein the operational data further includes information indicative of least one of a current of the primary coil, a voltage of the secondary coil, a voltage of a power supply coupled to the control system interface component, or a temperature of an enclosure component.

10. The circuit breaker system of claim 1, wherein the computer-executable components further comprise: a power supply component that is adapted to provide power to the control system interface component, the power supply component is adapted to derive source power from windings of the primary coil.

11. The circuit breaker system of claim 1, wherein the industrial automation device is a first industrial automation device and wherein the control system interface component is further adapted to measure circuit breaker related data and communicate circuit breaker related data to a second industrial automation device communicatively connected to the control system interface component.

12. The circuit breaker system of claim 11, wherein the circuit breaker related data comprises information indicative of at least one of a current flow of the primary coil, a voltage of the secondary coil, a temperature of an enclosure of the circuit breaker system or a tripping event associated with an overload condition.

13. The circuit breaker system of claim 1, wherein the control system interface component includes:

a data collection component adapted to measure the load exerted on the plunger deflector spring; and a network communication component adapted to facilitate a transmission of measurement data measured by the data collection component to the industrial automation device.

14. The circuit breaker system of claim 13, wherein the network communication component is further adapted to receive communication data indicative of a command to perform an action, wherein the action comprises an opening of the circuit breaker contact.

15. The circuit breaker system of claim 14, wherein the network communication component is further adapted to direct an overload voltage to the secondary coil component to perform a remote shutdown, in response to reception of the communication data.

16. A non-transitory computer readable storage medium comprising computer-executable instructions that, in response to execution, cause an industrial control system comprising a processor, to perform operations, comprising:

communicating, with an industrial automation device, operational data associated with a circuit breaker system, wherein the circuit breaker system includes a first coil, wrapped around a plunger, that provides current-based overload protection and a second coil that provides voltage-based overload protection, the second coil is implemented inline with the first coil; and determining measurement data based on measuring a load exerted on a plunger deflector spring, wherein the communicating includes facilitating a transmission of the measurement data to the industrial automation device.

17. The non-transitory computer readable storage medium of claim 16, wherein a mechanical movement of the plunger and an armature is integrated based on a magnetic field strength driven by current load associated with the first coil to break an electrical contact in an overload condition.

18. The non-transitory computer readable storage medium of claim 17, wherein the operations further comprise:

determining a current overload in the first coil based on the magnetic field strength being determined to satisfy an overload criterion.

19. A method, comprising:

measuring current through a primary coil that is wrapped around a plunger of a circuit breaker system;

measuring voltage across a secondary coil that is inline with the primary coil; and facilitating, by a system including a processor, a communication of operational data with an industrial automation device, wherein the facilitating includes facilitating a transmission of data indicative of a load exerted on a plunger deflector spring.

20. The method of claim 19, further comprising:

in response to determining that an overload criterion is satisfied, implementing an integrated mechanical movement of the plunger and an armature based on a magnetic field strength driven by the current of the primary coil to break an electrical contact within the circuit breaker system.

* * * * *